United States Patent [19]
Iizuka et al.

[11] Patent Number: 5,544,083
[45] Date of Patent: Aug. 6, 1996

[54] PASSWORD MANAGEMENT METHOD AND APPARATUS

[75] Inventors: Emiko Iizuka; Makoto Arai, both of Tokyo, Japan

[73] Assignee: Kabushiki Kaisha Toshiba, Kawasaki, Japan

[21] Appl. No.: 274,374

[22] Filed: Jul. 13, 1994

Related U.S. Application Data

[63] Continuation of Ser. No. 160,334, Dec. 2, 1993, abandoned, which is a continuation of Ser. No. 950,678, Sep. 25, 1992, abandoned.

[30] Foreign Application Priority Data

Apr. 27, 1992 [JP] Japan .................................. 4-107790
Aug. 31, 1992 [JP] Japan .................................. 4-232415

[51] Int. Cl.⁶ .................................................. G06F 15/00
[52] U.S. Cl. .............................. 364/709.01; 364/709.05
[58] Field of Search ................... 364/709.01, 709.05, 364/709.06, 706; 380/2, 3, 4

[56] References Cited

U.S. PATENT DOCUMENTS

| | | |
|---|---|---|
| 3,890,601 | 6/1975 | Pietrolewicz . |
| 4,234,920 | 11/1980 | Van Ness et al. . |
| 4,414,664 | 11/1983 | Greenwood . |
| 4,458,315 | 7/1984 | Uchenick . |
| 4,590,552 | 5/1986 | Guttag et al. . |
| 4,648,031 | 3/1987 | Jenner . |
| 4,654,792 | 3/1987 | Thomas . |
| 4,661,991 | 4/1987 | Logemann . |
| 4,674,038 | 6/1987 | Brelsford et al. . |
| 4,752,068 | 6/1988 | Endo . |
| 4,907,150 | 3/1990 | Arroyo et al. . |
| 4,942,606 | 7/1990 | Kaiser et al. . |
| 4,959,860 | 9/1990 | Watters et al. .................. 380/4 |
| 5,001,554 | 3/1991 | Johnson et al. . |
| 5,012,514 | 4/1991 | Renton ......................................... 380/4 |
| 5,027,396 | 6/1991 | Platteter et al. ........................... 380/4 |

FOREIGN PATENT DOCUMENTS 0230351 7/1987 European Pat. Off. .
2287835 11/1990 Japan .

OTHER PUBLICATIONS

IBM Technical Disclosure Bulletin, vol. 30, No. 5, Oct. 1987, Security System for Personal CD Mputers, pp. 57–58.
Manual of the Automated Patent System (MAPS), Mar. 8, 1990, U.S. Department of Commerce, U.S. Patent and Trademark Office; APS–TR–TRG–00–06.06.
Toshiba Reference Manual, 1st Edition, Nov. 1991, 6 pages, "T4400SX Portable Personal Computer".
Toshiba Reference Manual, 1st Edition, Nov. 1991, 9 pages, "T6400 Series Portable Personal Computer".
Toshiba Reference Manual, 1992, 12 pages, "T3300SL Notebook Computer".
User's Guide, Compaq Contura Family of Personal Computers, Jun. 1992, pp. 3–17 to 3–24.

*Primary Examiner*—Tan V. Mai
*Attorney, Agent, or Firm*—Oblon, Spivak, McClelland, Maier & Neustadt, P.C.

[57] ABSTRACT

In a computer system having a password registering function, when a floppy disk drive is connected to the system in registration of a password, the same password as that registered in the system is stored in a predetermined sector of a key floppy disk set in the floppy disk drive. In cancellation of a registered password, the key floppy disk is set in the floppy disk drive, and the password is read out from the predetermined sector of the key floppy disk. If the read out password coincides with the password registered in the system, both the password registered in the system and the password stored in the key floppy disk are erased.

35 Claims, 13 Drawing Sheets

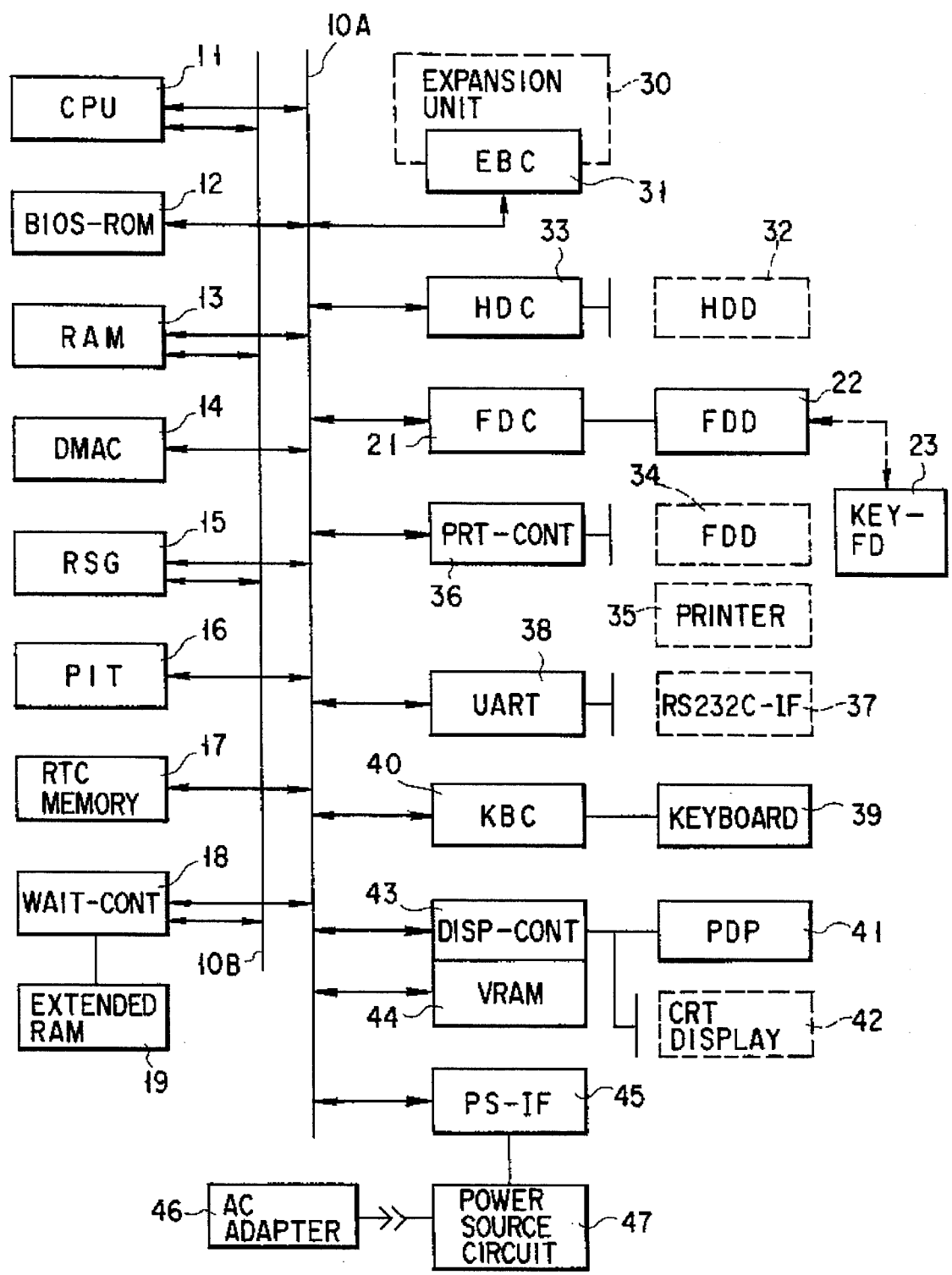
F I G. 1

SYSTEM SETUP MENU

MEMORY
```
Total       = 4096 KB
Base        =  640 KB
Extended    = 3328 KB
Shadow BIOS =  128 KB
```

DISPLAY
```
Display Adaptor     = VGA Compatible
Display Device      = Plasma
Plasma Display Mode = Color
Plasma Gray Scale   =
 Normal:Semi-Bright, Intense:Bright
```

HARD DISK
```
Capacity = 120 MB
```

CPU
```
CPU Type        = 486DX
CPU Clock Speed = 33 MHZ
```

COM/PRT/FDD
```
Serial Port        = COM1(IRQ4/3F8H)
Built-in Modem     = COM2(IRQ3/2F8H)
Expansion Slot     = IRQ3 Disable
External FDD/PRT   = Printer
Printer Port Type  = Output
```

OTHERS
```
Processing Speed    = High
Cache               = Enable
Display Auto Off    = 30min.
Numlock Init. State = ON
```

POWER ON PASSWORD
Not Registered

TIME & DATE
00:00:00, Mon Jan 01, 1990

Save settings and reboot ? (Y/N)
Insert Password Service Disk if necessary

FIG. 3

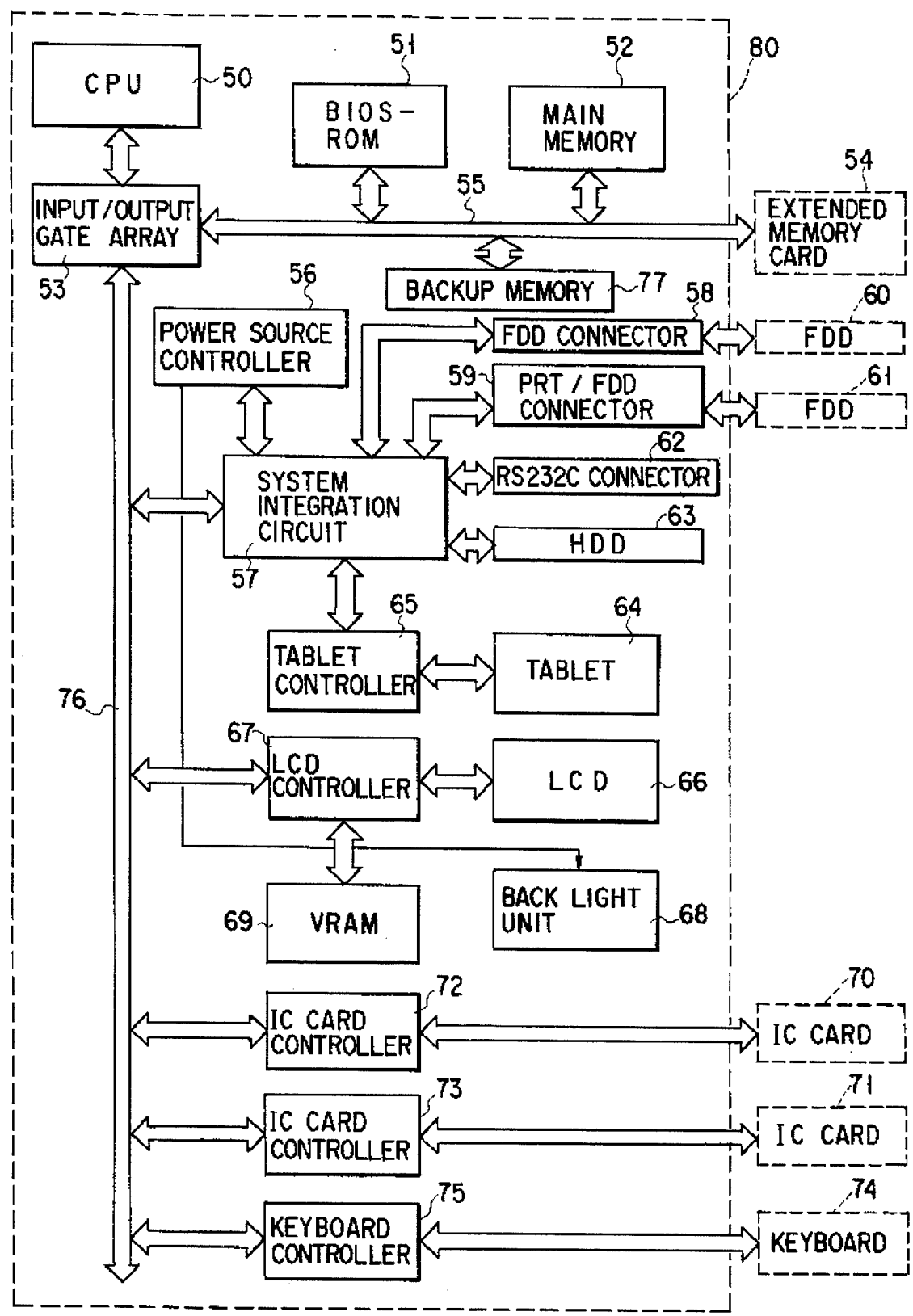
F I G. 5

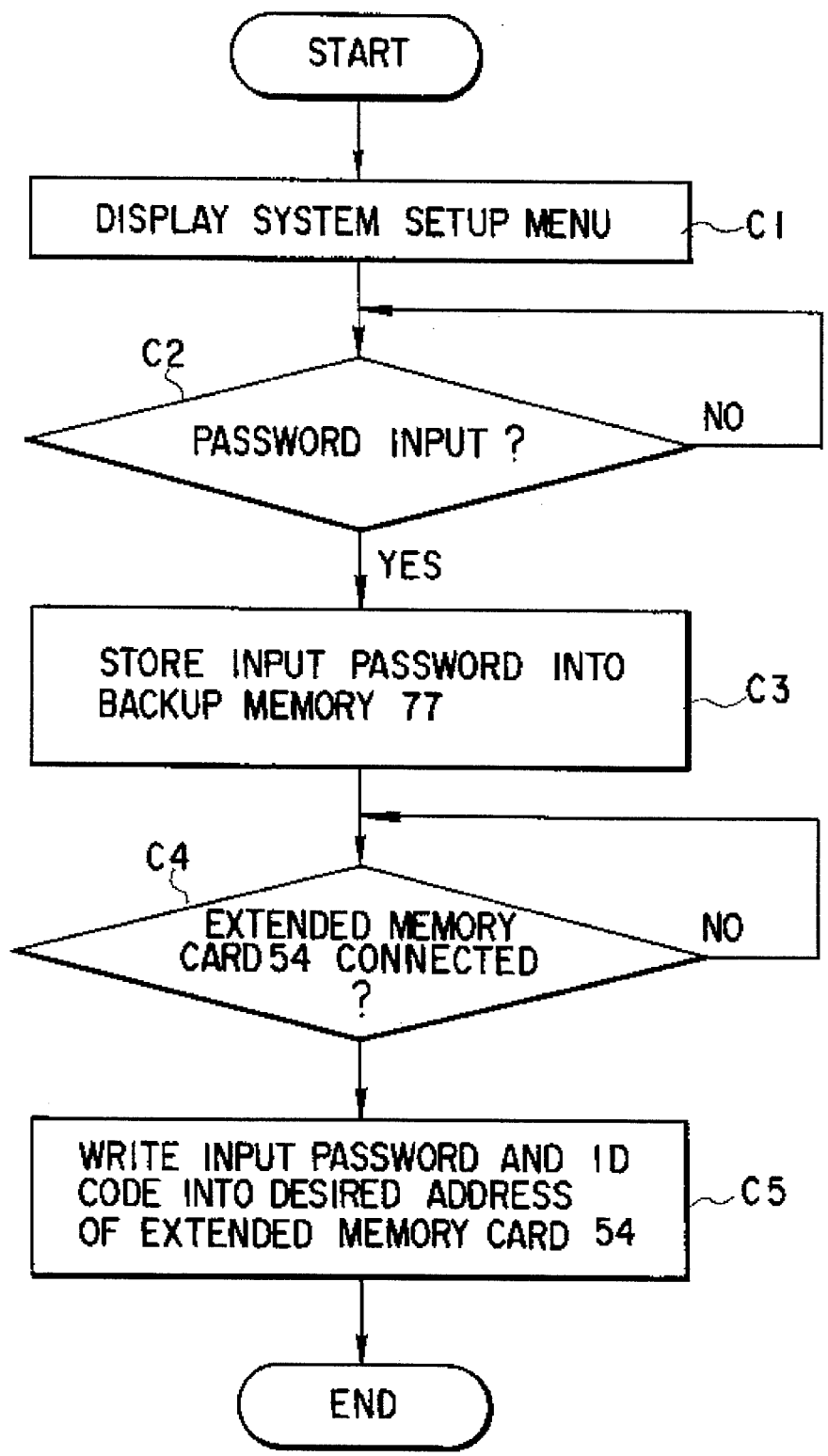
F I G. 6

1. SYSTEM SETUP = Normal

2. MEMORY
Total Memory = 4096KB
System Memory = 640KB
Hard RAM = 0KB
PM Memory = 3456KB
High Speed ROM = Disable 3. DISPLAY
LCD DISPLAY = Reverse
LCD Contrast = T▲▲▲▷ D 4. HARD DISK
Capacity = 20 MB 5.
Serial Port = COM 1
Modem Port = COM 2
Modem Power = On
FDD Type = 1.2/1.44MB
Printer Port = Output 6. OTHERS
Battery Mode = Saving Mode Processing Speed = LOW
CPU Sleep = Enabled
HDD Auto Off = 3 min.
DISPLAY Auto off = 3 min.
Brightness = Middle

7. PASSWORD

[BATTERY MODE]
⊙ Saving Mode   o Normal Mode
o Free Setting

[Ent] : Confirmation

↑↓ : Item Selection
←→ : Content Selection

[ESC] : End

| | ← | | Esc |
|---|---|---|---|
| | → | ↑ | |
| | | ↓ | Ent |

FIG. 7

| [POWER ON PASSWORD] | ↑ | ↓ | | Esc |
| Press Enter to set the password | | | | |
| | | | | |
| [ENT]:Execute | ← | → | | Ent |

FIG. 8A

| [POWER ON PASSWO | New | 7 | 8 | 9 | 0 |
| Press Enter ↑ | PASSWORD= | | | | |
| | | 4 | 5 | 6 | Del |
| | [DEL]:Cancel Input | | | | |
| [ENT]:Execute | [ENT]:Set Password | 1 | 2 | 3 | Ent |

FIG. 8B

| [POWER ON PASSWO | New | 7 | 8 | 9 | 0 |
| Press Enter ↑ | PASSWORD= **** | | | | |
| | | 4 | 5 | 6 | Del |
| | [DEL]:Cancel Input | | | | |
| [ENT]:Execute | [ENT]:Set Password | 1 | 2 | 3 | Ent |

FIG. 8C

| [POWER ON PASSWO | Verify | 7 | 8 | 9 | 0 |
| Press Enter ↑ | PASSWORD= | | | | |
| | | 4 | 5 | 6 | Del |
| | [DEL]:Cancel Input | | | | |
| [ENT]:Execute | [ENT]:Set Password | 1 | 2 | 3 | Ent |

FIG. 8D

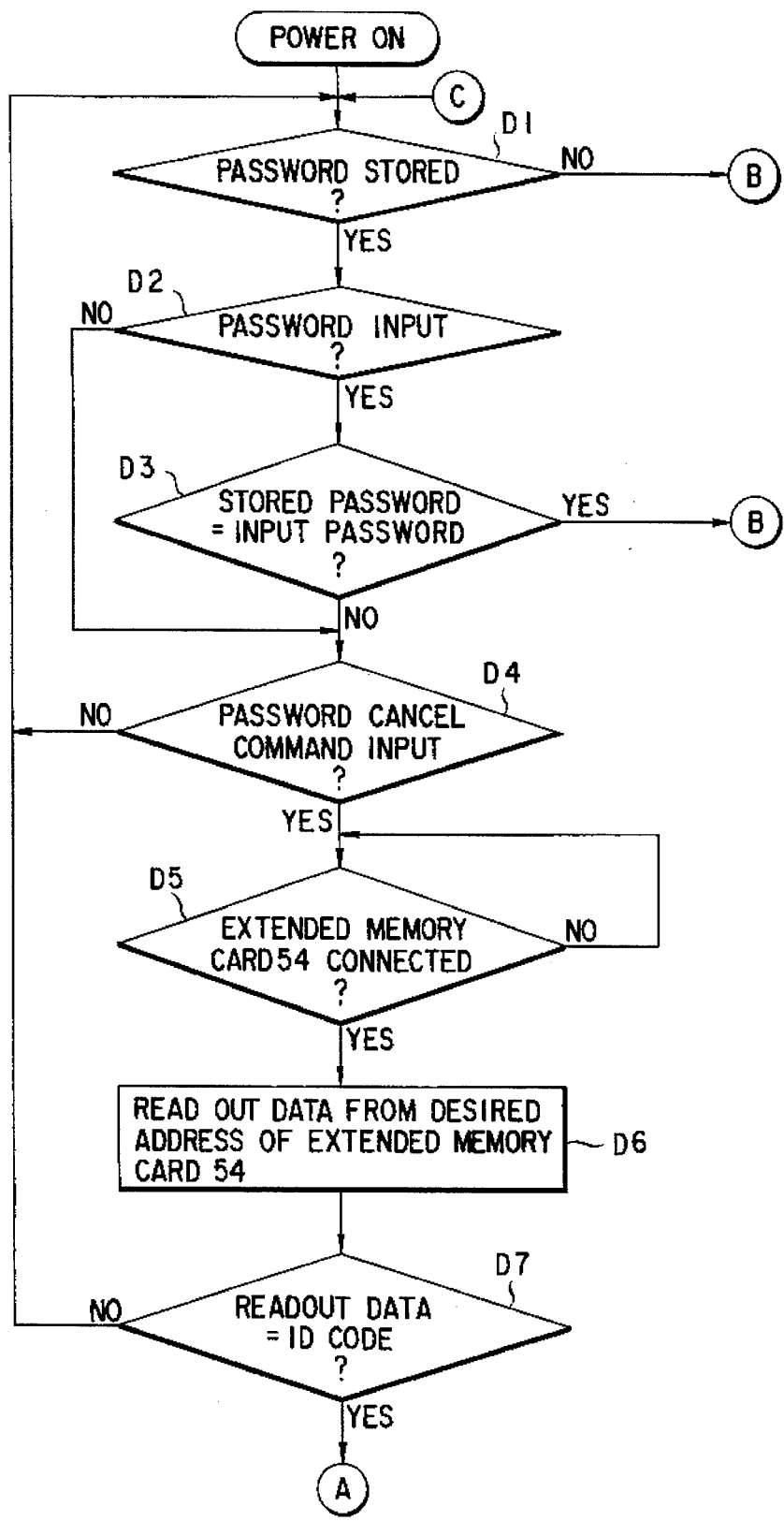
F I G. 9A

| [POWER ON PASSWORD] ■ Press Enter to cancel the password | | ↑ | ↑ | | Esc |
|---|---|---|---|---|---|
| | | | | | |
| [ENT]:Execute | | ← | ← | | Ent |

FIG. 10A

| [POWER ON PASSWO ■ Press Enter ↑ | old PASSWORD = | 7 | 8 | 9 | 0 |
|---|---|---|---|---|---|
| | | 4 | 5 | 6 | Del |
| [ENT]:Execute | [DEL]:Cancel Input [ENT]:Set Password | 1 | 2 | 3 | Ent |

FIG. 10B

| [POWER ON PASSWO ■ Press Enter ↑ | old PASSWORD= **** | 7 | 8 | 9 | 0 |
|---|---|---|---|---|---|
| | | 4 | 5 | 6 | Del |
| [ENT]:Execute | [DEL]:Cancel Input [ENT]:Set Password | 1 | 2 | 3 | Ent |

FIG. 10C

| | PLEASE TAP BELOW | | | |
|---|---|---|---|---|
| | | | | |
| Set Password Again ?<br>■ Yes    No | ← | → | | ENT |

F I G. 11

PASSWORD MANAGEMENT METHOD AND APPARATUS

This application is a Contuinuation of application Ser. No. 08/160,334, filed on Dec. 2, 1993 now abandoned, which is a continuation of application Ser. No. 07/950,678; filed on Sep. 25, 1992, now abandoned.

BACKGROUND OF THE INVENTION

1. Field of the Invention

The present invention relates to a password management method and apparatus used for a computer system having a password registering/checking function.

2. Description of the Related Art

Recently, laptop type computer systems, reduced in size and weight in consideration of portability, have been widely used as personal computer systems. In addition, computer systems which are further reduced in size and weight and hence have higher portability than the laptop type computer systems have been developed and put into practice. In computer systems of this type, data, commands, and the like are input by using special pens, tablets, and the like instead of using keyboards as in the conventional systems. Therefore, such a computer system may be called a pen input type computer system.

In such a computer system, a password is registered in consideration of confidentiality. More specifically, when this system is to be used, a user inputs a password to the system. In the system, the input password is compared with the registered password. If the two passwords coincide with each other, the system is activated.

Therefore, once a password is registered in the computer system having such a password registering function, the system cannot be started afterward unless the user inputs the same password as that registered, when the system is powered on. If, for example, the user forgets the password after it is registered in the system, the system cannot be started unless the same password as that registered is input to the system.

In such a case, the system can be started by canceling the password registered in the system. However, in a system capable of registering a password, in order to realize a highly reliable security mechanism, the registered password cannot be easily canceled.

In a conventional system, a registered password is canceled in the following manner. The system main body is disassembled, and the application of a voltage from a battery backup circuit to an RTC (real time clock) memory, which is backed up by a battery and serves to store the password, is interrupted to cause a bad battery error state. With this operation, information including the password is erased. Alternatively, a special jig is used to form a special circuit so as to erase retained information including the password. As described, in either case, a special technique and a special operation are required, and much time and labor are required.

It is, therefore, difficult for general users to cancel passwords registered in systems. That is, cancellation of a password must be performed by an expert with special knowledge and skill associated with the system.

Under the circumstances, demands have arisen for a password management apparatus, in a computer system having a password registering/canceling function, which can manage a password to allow a proper user to start the system, even if the user forgets the password, by supporting a recording medium such as a floppy disk or a memory card for password cancellation.

SUMMARY OF THE INVENTION

It is an object of the present invention to provide a password management apparatus, in a computer system having a password registering/canceling function, which can manage a password to allow a proper user to start the system by supporting a recording medium such as a floppy disk or a memory card for password cancellation even if the user forgets the password.

According to the present invention, there is provided a data processing system which allows a recording medium to be set therein, comprising: input means for inputting a password; storage means for storing the input password; means for checking whether the recording medium is set in the data processing system if the password is input; and write control means for writing the input password in the recording medium if the recording medium is set in the data processing system.

In addition, according to the present invention, there is provided a password management method in a data processing system which allows a recording medium to be set therein and has a password memory for storing a password, comprising the steps of: inputting a password; storing the input password; checking whether a recording medium is set in the data processing system, if a password is input; and writing the input password in the recording medium, if the recording medium is set in the data processing system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of a computer system according to the first embodiment of the present invention;

FIG. 3 is a view showing a setup menu of the first embodiment of the present invention;

FIG. 5 is a block diagram showing the arrangement of a pen input type computer system according to the second embodiment of the present invention;

FIG. 6 is a flow chart showing a sequence for preparing a key floppy in registration of a password according to second embodiment of the present invention;

FIG. 7 is a view showing a setup menu including password designation in the second embodiment of the present invention;

FIGS. 8A, 8B, 8C and 8D are views showing window displays to explain password, registration processing in the second embodiment of the present invention;

FIGS. 9A and 9B are flow charts showing a sequence for canceling a registered word in the second embodiment of the present invention;

FIGS. 10A, 10B and 10C are views showing window displays to explain processing for canceling a registered password word in the second embodiment of the present invention; and FIG. 11 is a view showing window display to explain processing for canceling a registered password using a floppy disk in the second embodiment of the present invention.

DETAILED DESCRIPTION OF THE PREFERRED EMBODIMENTS

Figure 2:
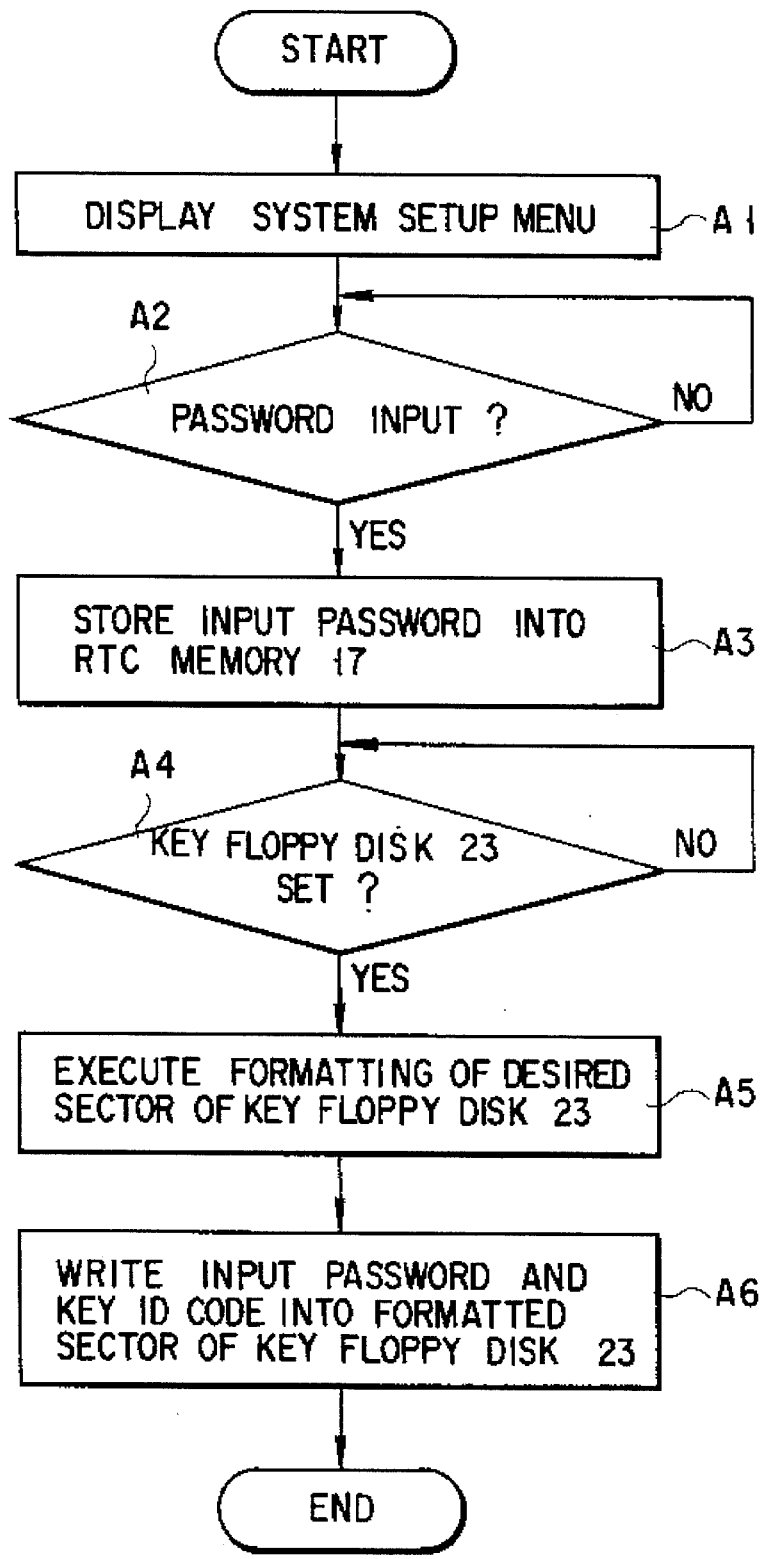
FIG. 2 is a flow chart showing a sequence for preparing a key floppy disk in registration of a password according to the first embodiment of the present invention.

Embodiments of the present invention will be described below with reference to the accompanying drawings.

FIG. 1 is a block diagram showing the arrangement of a computer system according to the first embodiment of the present invention. Referring to FIG. 1, the computer system includes a system bus 10A, an internal bus 10B, a CPU (central processing unit) 11 for controlling the overall computer system, a BIOS (basic input and output system)-ROM (read only memory) 12 for storing a BIOS such as an initialization program, a RAM (random access memory) 13 used as a main memory for storing a program, data, and the like to be processed, a DMAC (direct memory access controller) 14 for performing direct memory access control, an RSG (refresh signal generator) 15 for generating a refresh signal for memory refresh operation, a PIT (programmable interval timer) 16 which can be set by a program, an RTC (real time clock) memory 17 backed up by an operating battery (not shown) and used as a timer module, a wait controller (WAIT-CONT) 18, and an extended RAM 19.

When a power source switch (not shown) is turned on, the CPU 11 accesses the BIOS-ROM 12 to start the BIOS stored therein. In accordance with this BIOS, the CPU 11 executes system starting processing including preparation of a key floppy disk and cancellation of a registered password by using the prepared key floppy disk.

The RTC memory 17 stores alwaysrequired information such as system control information, in addition to date and time information. A password for this system is stored in the RTC memory 17.

The wait controller 18 switches wait times for determining read/write cycle times in accordance with the extended RAM 19 which is set therein, thus performing access control of the extended RAM 19.

In addition, the computer system of this embodiment includes a floppy disk controller (FDC) 21 and a floppy disk drive (FDD) 22.

The floppy disk controller 21 accesses the floppy disk drive 22 under the control of the CPU 11.

The floppy disk drive 22 is read/write-accessed by the floppy disk controller 21. When, for example, preparation of a key floppy disk in registration of a password, or cancellation of a registered password by using a key floppy disk is to be performed, a key floppy disk (KEY-FD) 23 is set in the floppy disk drive 22.

In the key floppy disk 23, a predetermined sector, on the data recording surface, which is designated by the BIOS in registration of the password is formatted. In this formatted sector, the password registered in the system is stored together with a key ID code unique to the key floppy disk 23.

The computer system further includes an EBC (expansion bus connector) 31 capable of connecting an expansion unit 30, used to expand the function of the system, to the system, a hard disk controller (HDC) 33 for controlling a hard disk drive (HDD) 32, a printer controller (PRT-CONT) 36 for controlling a floppy disk drive (FDD) 34 or a printer 35 which are selectively connected to the system, a UART (universal asynchronous receiver/transmitter) 38 to which an RS232C interface (RS232C-IF) 37 can be connected, a keyboard 39, a keyboard controller (KBC) 40 for controlling a key input operation of the keyboard 39, a plasma display (PDP) 41, a display controller (DISP-CONT) 43, a VRAM 44, a power source interface (PS-IF) 45, an AC (alternating current) adapter 46, and a power source circuit 47.

The display controller 43 performs display control of the plasma display 41 or a selectively connected CRT (cathode ray tube) display 42. The power source interface 45 performs data transmission between the system and the power source circuit 47. The AC adapter 46 rectifies/smooths an AC voltage applied from an external power source (not shown) and applies a predetermined DC voltage to the power source circuit 47. The power source circuit 47 applies a drive voltage to each component in the computer system of the embodiment.

FIG. 2 is a flow chart showing a sequence for preparing a key floppy disk in registration of a password according to the first embodiment. This processing is executed in accordance with the BIOS stored in the BIOS-ROM 12.

Referring to FIG. 2, in step A1, a system setup menu (see FIG. 3) is displayed on, e.g., the plasma display 41 when the system is started.

In step A2, it is checked whether a password is input by a user through the keyboard 39.

In step A3, the password input through the keyboard 39 is stored in the RTC memory 17. With this operation, the password is registered in the system.

In step A4, it is checked whether the key floppy disk 23 is set in the floppy disk drive 22.

In step A5, a predetermined section on the recording surface of the key floppy disk 23 is formatted. This predetermined sector is designated by the BIOS.

In step A6, the input password stored in the RTC memory 17 is written in the formatted predetermined sector of the key floppy disk 23. In this case, a predetermined key ID code unique to the key floppy disk 23 is written in the formatted predetermined sector together with the input password. Note that the input password to be written is subjected to data compression/conversion. For example, the input password is processed as a binary bit string. This bit string is then divided by a predetermined polynomial $(X^{16}+X^{12}+X^5)$. The remainder left after the division is the data-compressed/converted input password. Upon such data compression/conversion, the data length of a converted input password is almost constant regardless of the data length of an input password before conversion.

Figure 4A:
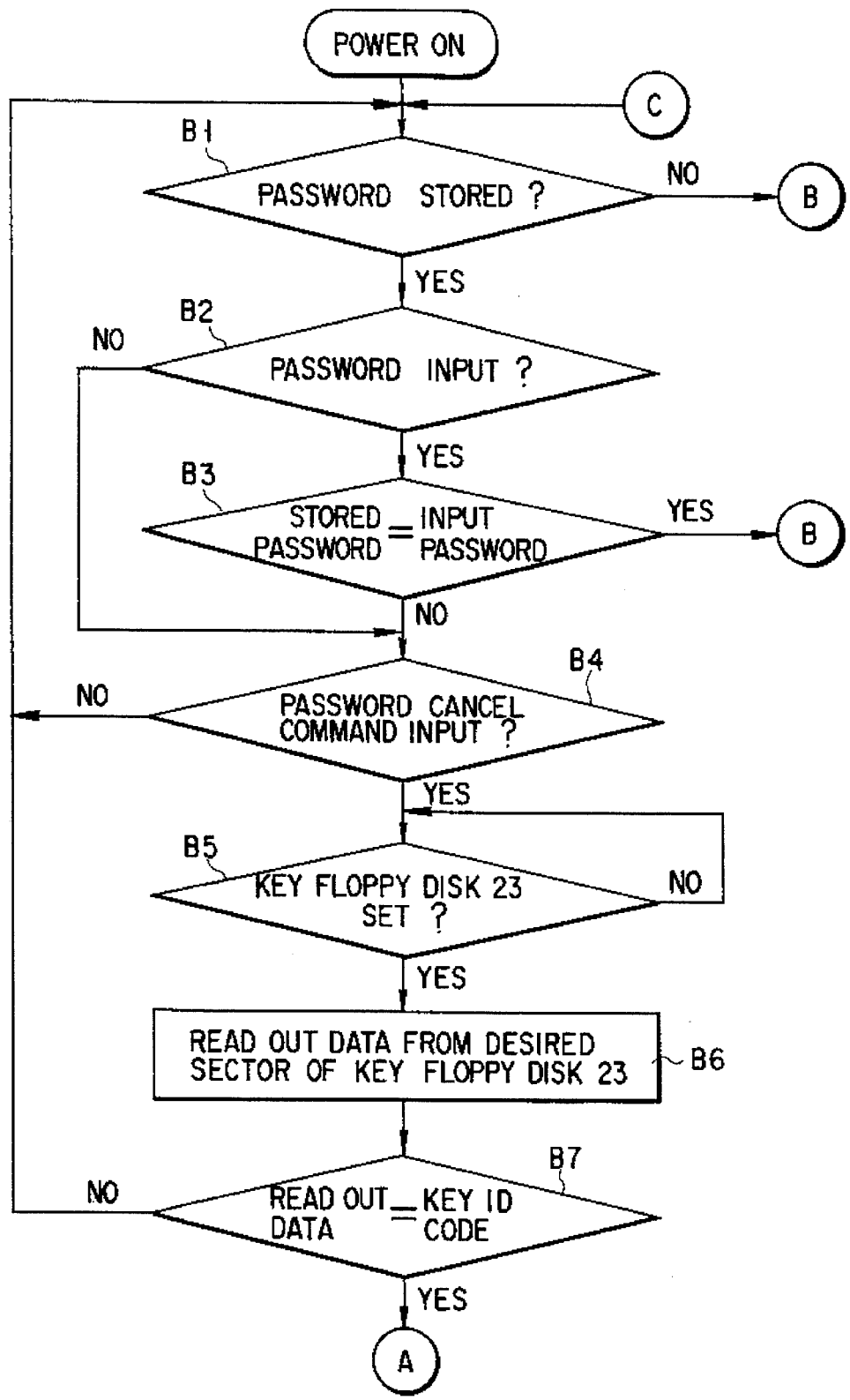
FIG. 4A and 4B are flow charts showing a sequence for canceling a registered password by using a key floopy disk in the first embodiment of the present invention.
Figure 4B:
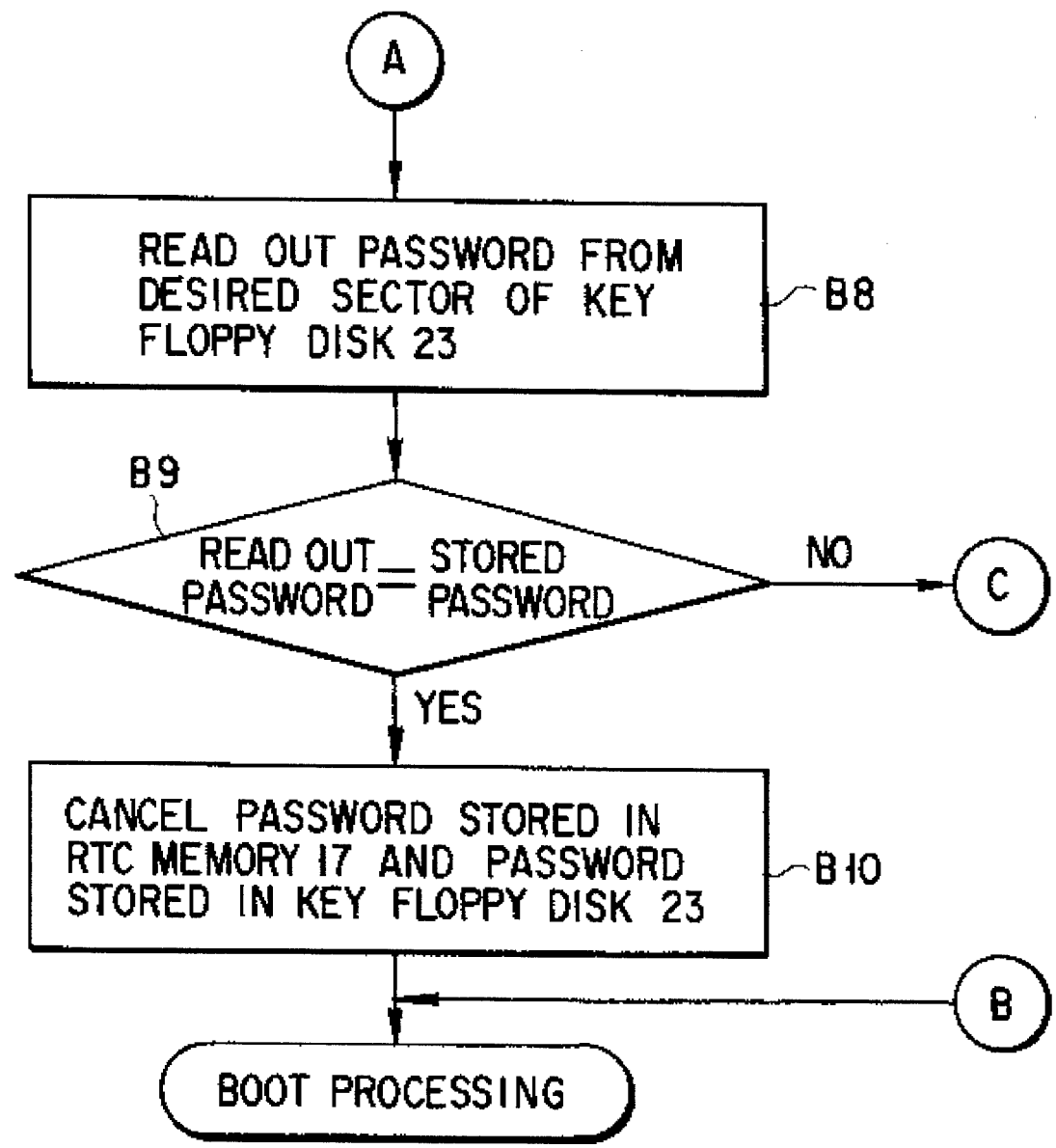

FIGS. 4A and 4B are flow charts showing processing for canceling a registered password by using the key floppy disk according to the first embodiment. This processing is executed in accordance with the BIOS stored in the BIOS-ROM 12.

In step B1, it is checked whether a password is registered in the system, i.e., a password is stored in the RTC memory 17.

If a password is stored in RTC memory 17, it is checked in step B2 whether a password is input by a user through the keyboard 39.

In step B3, it is checked whether the input password from the keyboard 39 coincides with the password stored in the RTC memory 17.

When a password is stored in the RTC memory 17, it is checked in step B4 whether a password cancel command representing cancellation of a password is input through the keyboard 39.

If a password cancel command is input, it is checked in step B5 whether the key floppy disk 23 is set in the floppy disk drive 22. The processing in step B6 and the subsequent steps is interrupted until the key floppy disk 23 is set in the floppy disk drive 22.

when the key floppy disk 23 is set in the floppy disk drive 22, data is read out from a predetermined sector of the key floppy disk 23 in step B6. This predetermined sector is designated by the BIOS in the processing in step A5 in which registration of a password is performed, and corresponds to a formatted sector.

In step B7, it is checked whether the data read out from the predetermined sector is a key ID code unique to the key floppy disk 23.

If the data read out from the predetermined sector is the key ID code unique to the key floppy disk 23, a password is read out from the predetermined sector in step B8.

In step B9, it is checked whether the password read out from the predetermined sector coincides with the password stored in the RTC memory 17.

When the password registered in the system coincides with the password stored in the key floppy disk 23, the passwords are canceled in step B10. More specifically, the password stored in the RTC memory 17 and the password and the key ID code stored in the predetermined sector of the key floppy disk 23 are erased, and normal boot processing is performed.

An operation of the first embodiment of the present invention will be described below with reference to FIGS. 2, 4A, and 4B.

A sequence for preparing a key floppy disk in registration of a password will be described first with reference to FIG. 2.

When the power source switch is turned on, the system setup menu (FIG. 3) is displayed on the plasma display 41 (step A1). As shown in FIG. 3, since "Not Registered" is set in item "POWER ON PASSWORD" of the displayed system setup menu, the user inputs a password trough the keyboard 39 if he/she wants to register the password. In this case, the input password is constituted by 10 characters or less.

In step A2, it is checked whether a password is input through the keyboard 39. If YES in step A2, the user is requested to input a password in order to verify the input operation of the password. If the password input again by the user coincides with the previously input password, the input password is stored in the RTC memory 17 (step A3). With this operation, the password is registered in the system. If the passwords do not coincide with each other, an error message is displayed, and the user is requested again to input a password.

In order to prepare the key floppy disk 23, the user sets the key floppy disk 23 in the floppy disk drive 22. In step A4, it is checked whether the key floppy disk 23 is set in the floppy disk drive 22. If the key floppy disk 23 is set in the floppy disk drive 22, a predetermined sector, on the recording surface of the key floppy disk 23, which is designated by the BIOS is formatted (step A5).

In the predetermined sector, on the recording surface of the set key floppy disk 23, which is formatted in step A5, the input password stored in the RTC memory 17 and a key ID code unique to the input password are written (step A6). With this operation, "Registered" is set in item "POWER ON PASSWORD" of the system setup menu.

When preparation of the key floppy disk is completed with the above described processing, the user is requested to remove the key floppy disk 23. After the user removes the key floppy disk 23 from the floppy disk drive 22, reboot processing is performed.

In this manner, when the key floppy disk 23 used for cancellation of the password is set in the floppy disk drive 22, the predetermined sector on the recording surface of the key floppy disk 23 is formatted, and the password registered in the system is written in the predetermined sector.

A sequence for canceling a registered password by using a key floppy disk will be described next with reference to the flow charts shown in FIGS. 4A and 4B.

When the power source switch is turned on, it is checked whether a password is registered in the system (step B1). That is, it is checked whether a password is stored in the RTC memory 17. If a password is registered in the system, it is checked in step B2 whether the password is input through the keyboard 39.

If the password is input through the keyboard 39, it is checked in step B3 whether the input password coincides with the password stored in the RTC memory 17.

If no password is registered in the system, or if a password is registered in the system, and the registered password coincides with the input password, boot processing is performed.

If it is determined in step B3 that the input password does not coincide with the password stored in the RTC memory 17, it is checked in step B4 whether a password cancel command is input.

If YES in step B4, it is checked whether the key floppy disk 23 is set in the floppy disk drive 22 (step B5). In this case, the processing in step B6 and the subsequent steps is interrupted until the key floppy disk 23 is set in the floppy disk drive 22.

If it is determined in step B5 that the key floppy disk 23 is set in the floppy disk drive 22, data is read out from a predetermined sector on the recording surface of the key floppy disk 23 (step B6).

In step B7, it is checked whether the data read out from the predetermined sector on the recording surface of the key floppy disk 23 is a key ID code unique to the floppy disk drive 22. If YES in step B7, the password is read out from the predetermined sector (step B8).

In step B9, it is checked whether the read password coincides with the password stored in the RTC memory 17. If YES in step B9, the password stored in the RTC memory 17 and the password stored in the predetermined sector on the recording surface of the key floppy disk 23 are erased. Note that the key ID code stored in the predetermined sector on the recording surface of the floppy disk drive 22 is also erased. With this operation, "Not Registered" is set in item "POWER ON PASSWORD" of the system setup menu. Therefore, the password registered in the system is canceled, and normal boot processing is executed.

In this manner, at the start of the system, when the key floppy disk 23 is set in the floppy disk drive 22, and a password cancel command is input through the keyboard 39, the password stored in the key floppy disk 23 is compared with the password registered in the system under the control of the BIOS. When the two passwords coincide with each other, the password registered in the system is canceled, and the password stored in the key floppy disk 23 is erased.

Since the user prepares a key floppy disk in registration of a password by using the password canceling function using such a key floppy disk, even if the user forgets the password, the password registered in the system can be easily canceled by using the key floppy disk. This prevents an unauthorized person from canceling the password to realize a highly reliable confidential mechanism, and allows a proper user to easily cancel a registered password so as to start the system.

In the first embodiment, when the password stored in the key floppy disk coincides with the password registered in the system upon comparison therebetween, both the password registered in the system and the password stored in the key floppy disk are erased. However, in the present invention, only the password registered in the system may be erased. In this case, after the password is canceled, the use of the key floppy disk in which the previously registered password is stored can be inhibited by registering another password. The effective confidentiality can be maintained.

Furthermore, in the first embodiment, preparation of a key floppy disk and cancellation of a registered password by using a key floppy disk are executed at the start of the system. However, the present invention is not limited to this. For example, preparation of a key floppy disk and cancellation of a registered password can be performed by using predetermined commands, a pop-up menu, and the like.

The second embodiment of the present invention will be described below.

FIG. 5 is a block diagram showing the arrangement of a pen input type computer system according to the second embodiment of the present invention.

A pen input type computer system 80 shown in FIG. 5 comprises a CPU 50, a BIOS-ROM 51, a main memory 52, an input/output gate array 53, an extended memory card 54, a power source controller 56, a system integration circuit 57, a floppy disk drive (FDD) connector 58, a PRT/FDD connector 59, floppy disk drives (FDDs) 60 and 61, an RS232C connector 62, a hard disk drive (HDD) 63, a tablet 64, a tablet controller 65, an LCD 66, an LCD controller 67, a back light unit 68, a VRAM 69, IC cards 70 and 71, IC controllers 72 and 73, a keyboard 74, a keyboard controller 75, buses 55 and 76, and a backup memory 77.

Note that the main body (not shown) of the pen input type computer system 80 shown in FIG. 5 is flat and has a size of, e.g., about 210 mm×300 mm×20 mm. The liquid crystal display (LCD) 66 is arranged on a predetermined surface of the system main body, and the transparent type tablet 64 is placed thereon.

The tablet 64 is controlled by the tablet controller 65. When a predetermined position on the tablet 64 is touched with a pen or the like, coordinate data representing the predetermined position is generated. The generated coordinate data is output to the tablet controller 65. The tablet controller 65 receives the coordinate data output from the tablet 64 and outputs the received coordinate data to the system integration circuit 57.

The system integration circuit 57 is connected to the bus 76. For example, the system integration circuit 57 serves to serially receive coordinate data output from the tablet controller 65, convert the received coordinate data into parallel data, and store the data in an internal buffer (not shown).

The LCD 66 displays character data, image data, and the like on its display surface. The LCD controller 67 is connected to the bus 76 and serves to perform display control of the LCD 66.

The BIOS-ROM 51 is connected to the bus 55 and serves to store a basic input and output system (BIOS) such as a setup program. This setup program includes processing routines for executing password registration processing and registered password canceling processing.

The power source controller 56 is connected to the system integration circuit 57 and controls voltages to be applied to the respective components of the system.

The CPU 50 is connected to the buses 55 and 76 through the input/output gate array 53 and controls the overall system when the power source switch (not shown) of the system is turned on, and voltages are applied from the power source controller 56 to the respective components, the CPU 50 starts the BIOS stored in the BIOS-ROM 51. In addition, the CPU 50 reads out data stored in the internal buffer of the system integration circuit 57.

The backup memory 77 is backed up by a battery (not shown) and stores a password. This password is input by a user through the tablet 64 using the system setup menu displayed on the display surface of the LCD 66 upon starting the setup program.

The extended memory card 54 is used as an optional memory. If the extended memory card 54 is connected to the bus 55 in password registration processing to be described later, it stores the password input through the tablet 64 or the like.

Password registration processing and registered password canceling processing at the start of the pen input type computer system of the second embodiment will be described next.

Password registration processing will be described first with reference to FIG. 6.

When the power source switch of the system is turned on, and voltages are applied from the power source controller 56 to the respective components, the CPU 50 starts the BIOS stored in the BIOS-ROM 51. With this operation, the setup program is executed.

In step C1, as shown in FIG. 7, the system setup menu is displayed on the display surface of the LCD 66. Assume that "Not registered" is set in item "7. PASSWORD" of the system setup menu. In this case, when the user touches the [Ent] key on the system setup menu with a pen or the like to register a password, the window shown in FIG. 8A is displayed.

If the [Ent] key is touched by the user with a pen or the like on this window, the window shown in FIG. 8B is displayed. At this time, a password constituted by four digits or less can be input. If a password constituted by five digits or more is input, the fifth and subsequent digits are neglected. Note that a input operation can be performed again. As shown in FIG. 8C, the digits constituting the input password are not displayed on the window but symbols "*" are displayed instead.

In step C2, it is checked whether a password is input by the user through the tablet 64. If YES in step C2, the user is requested again to input a password in order to verify the input operation (see FIG. 8D). If the password input again by the user coincides with the previously input password, the input password is stored in the backup memory 77 (step C3).

With this operation, the password is registered in the system. Note that the input password to be stored is subjected to data compression/conversion. For example, the input password is processed as a binary bit string. This bit string is then divided by a predetermine polynomial. The remainder left after the division is the data-compressed/converted input password.

In step C4, it is checked whether the extended memory card 54 is connected to the bus 55. If YES in step C4, the input password stored in the backup memory 77 and an ID code unique to the input password are written at a predetermined address of the extended memory card 54 (step C5). This predetermined address is designated by the started BIOS. With this operation, "Registered" is set in item "7. PASSWORD" of the system setup menu.

Note that if the FDD 61 or 62 as an optional device is connected to the connector 58 or 59, and a floppy disk (FD) is set in the FDD 61 or 62, the set floppy disk is used as the key floppy disk in the first embodiment, and the password is registered in the same manner as the processing shown in FIG. 2.

Figure 9B:
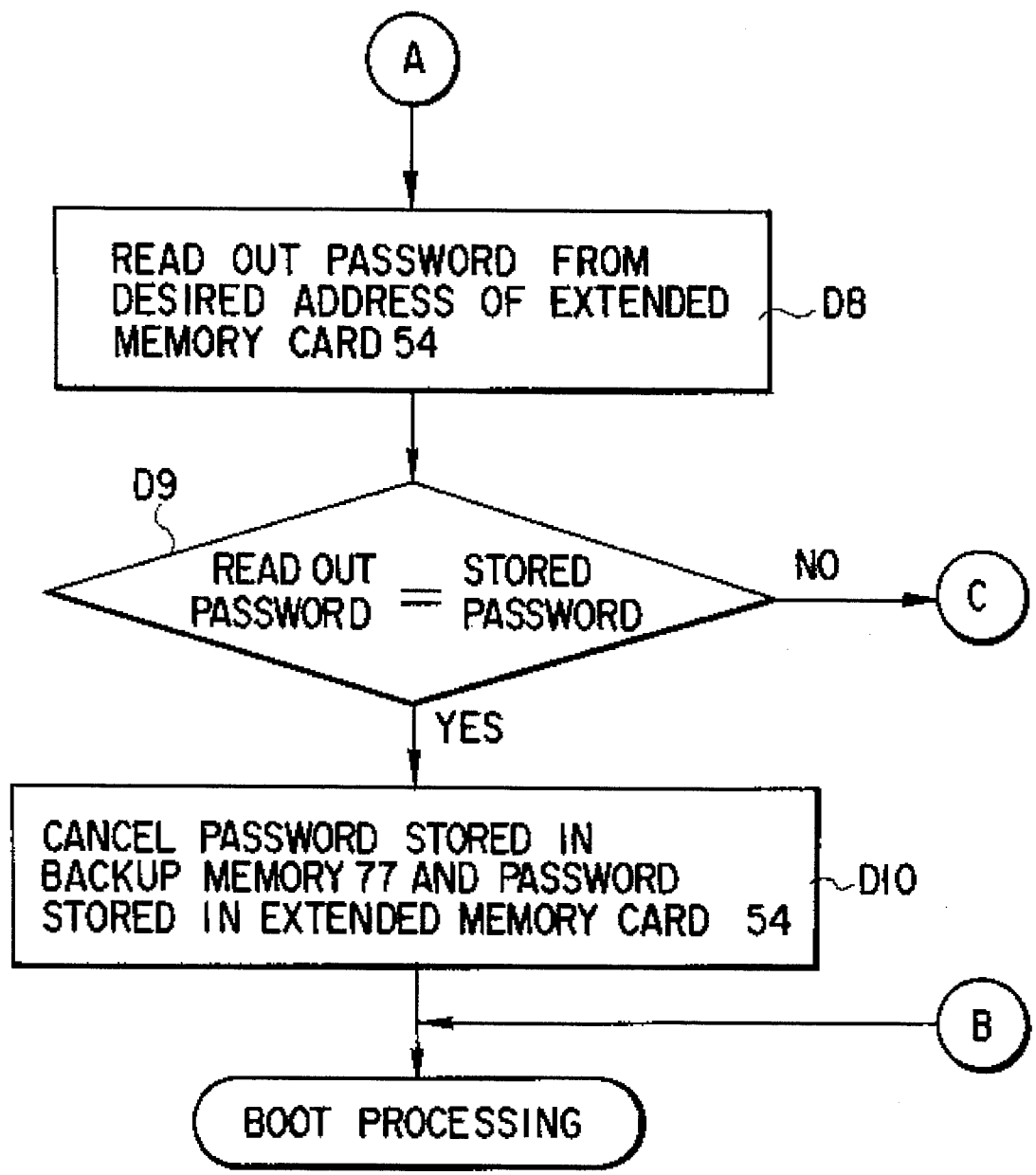

Registered password canceling processing by using an extended memory card will be described next with reference to FIGS. 9A and 9B.

When the power source switch of the system is turned on, and voltages are applied from the power source controller 56 to the respective components, the CPU 50 starts the BIOS stored in the BIOS-ROM 51. With this operation, the setup program is executed.

Assume that "Registered" is set in item "7. PASSWORD" of the system setup menu displayed on the display surface of the LCD 66, as shown in FIG. 7. In this case, when the user touches the [Ent] key on the system setup menu with a pen or the like in order to cancel the password, the window shown in FIG. 10A is displayed.

If the user touches the [Ent] key on the window with a pen or the like, the window shown in FIG. 10B is displayed. At this time, similar to the password registration processing, a password constituted by four digits or less can be input. If a password constituted by five digits or more is input, the fifth and subsequent digits are neglected. As shown in FIG. 8C, the digits constituting the input password are not displayed on the window but symbols "*" are displayed instead.

In step D1, it is checked whether a password is registered in the system. That is, it is checked whether a password is stored in the backup memory 77.

If YES in step D1, it is checked in step D2 whether a password is input.

If YES in step D2, it is checked whether the input password coincides with the password stored in the backup memory 77 (step D3).

Note that if no password is registered, or a password is registered and the same password as the registered one is input, normal boot processing is executed.

If it is determined in step D3 that the input password coincides with the password stored in the backup memory 77, it is checked whether a password cancel command representing cancellation of the password is input (step D4).

If it is determined in step D4 that a password cancel command is input, it is checked in step D5 whether the extended memory card 54 is connected to the bus 55. Note that if the extended memory card 54 is not connected to the bus 55, the processing in step D6 and the subsequent steps is interrupted until the extended memory card 54 is connected to the bus 55.

If YES in step D5, data is read out from a predetermined address of the extended memory card 54 (step D6).

In step D7, it is checked whether the data read out from the predetermined address of the extended memory card 54 is an ID code unique to the extended memory card 54 in which the password is registered. If YES in step D7, the password is read out from the predetermined address (step D8).

In step D9, it is checked whether the password read out from the predetermined address of the extended memory card 54 coincides with the password stored in the backup memory 77. If YES in step D9, the password stored in the backup memory 77 and the password stored in the extended memory card 54 are erased. Note that the ID code is also erased. Therefore, the password registered in the system is canceled, and normal boot processing is executed.

As described above, if an extended memory card is connected to the system in password registration processing at the start of the system, a password is also stored in the extended memory card. If a password cancel command is input, the password stored in the extended card memory is compared with the password registered in the system. If the two passwords coincide with each other, both the password registered in the system and the password stored in the extended memory card are erased.

Note that, as described above, a password includes a user password registered by the user on the system setup menu and a master key registered in advance by a dealer using a maintenance test program in order to properly respond to a case wherein the user forgets the registered password.

As described above, a password is constituted by four digits or less and supports ASCII codes 30h to 39h. Therefore, input of ASCII codes other than these codes are neglected.

A user password and a master key are stored, as 2-byte data values obtained by CRC processing, at the following addresses of the backup memory 77:

user password: CMOS35h, 36h
master key: CMOS33h, 34h

If no password is registered in the system, all the values stored at CMOS33h to 36h are 00h. If a master key is registered but no user password is registered, the user is not requested to input a password at the start of the system.

If the value obtained by CRC operation of a user password and a master key is 0000h, a value obtained by adding 1 to the data value 0000h is stored at CMOS35h, 36h and CMOS33h, 34h. In the CRC operation, a character string of the password is processed as a serial binary bit string. This binary bit string is divided by a predetermined polynomial $(X^{16}+X^{12}+X^5)$. The remainder left after the division is a result of the CRC operation. Upon such operation, the password is coded by 16 bits.

Assume that a value other than 0000h is stored at CMOS35h, 36h. In this case, since a user password is registered, if no password is input at the start of the system, the system is not started. In contrast to this, if a value obtained by performing CRC operation of an input password coincides with a value stored at CMOS35h, 36h or CMOS33h, 34h at the start of the system, the system is started.

If a check sum error or a bad battery error occurs in an IRT (initial reliability test), all the values stored in at CMOS33h to 36h are set to be 00h. With this operation, the registered password is canceled. If the setup program is started in response to a check sum error or bad battery error, the data value 00h is written at CMOS33h to 36h.

If a value other than 00h is accidentally written at CMOS35h, 36h, no check sum error is caused. In this case, however, even if no user password is registered, the system cannot be started unless password is input at the start of the system. In order to prevent this, if, for example, the folded connector of a printer is connected to the system, the data value 00h is written at CMOS35h, 36h in boot processing or suspend processing without requesting the user to input a password.

If the system has a resume function, the windows shown in FIGS. 8A to 8D are displayed upon completion of suspend processing, and a password is input in the same manner as described above.

In order to activate the computer system even if a user forgets the password registered in the computer system, the password is stored in a floppy disk. therefore, the password can be canceled only when the floppy disk is set into a floppy disk drive. This is called a service disk. Saving of the password to the floppy disk is performed by the system setup program.

When the password has registered in the computer system, after the computer system is powered on and a password input window is displayed on a display device, [Enter] key is touched first, the following process is executed.

It is checked whether a floppy disk drive is connected to the computer system when the floppy disk drive is not connected to the computer system, processing returns a password input waiting process.

When the floppy disk drive is connected to the computer system, it is checked whether a floppy disk is inserted into the connected floppy disk drive. When the floppy disk is not inserted, processing returns the password input waiting process. When the floppy disk is inserted, an ID "KEY" representing a password service disk is stored from zero byte of a desired region (head number 0, track number 0, sector number 2) of the floppy disk and a value representing 2 bytes from third byte is compared with values of CMOS memory addresses 33h and 34h (or 35h and 36h).

When both values coincides with each other, the values of the CMOS memory addresses 35h and 36h and a value of 5 bytes from zero byte to fourth byte in the desired region (head number 0, track number 0, sector number 2) of the floppy disk are zero-cleared. When the input ID or the input password does not coincide with an ID or a password, to be registered in the computer system, processing returns the password input waiting process.

After the above processing is completed, motors (not shown) of the floppy disk drive are stopped.

When the input ID and the input password coincides with the registered ID and the registered password, display screen as shown in FIG. 11 is displayed and key input is waited.

When "YES" is selected and [Enter] key is touched, the system setup program is started.

When "NO" is selected and [Enter] key is touched, the message "Remove the disk, then tip any point on screen with stylus pen or press any key to continue" is displayed on the top line of the display screen and pen input or key input is waited. When a desired position of the display screen is tipped by a pen or a desired key is touched, boot processing is executed.

As described above, since the pen input type computer system has the functions of registering a password and canceling a registered password by using an extended memory card, even if the user forgets a password, he/she can easily cancel the password registered in the system, and improper cancellation of a password by a third person can be prevented to realize a highly reliable confidential mechanism.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing system which allows a recording medium to be set therein, comprising:

input means for inputting a password;

storage means for storing the input password;

means for checking whether the recording medium is set in the data processing system if the password is input; and write control means for writing the input password into the recording medium if the recording medium is set in the data processing system.

2. A system according to claim 1, further comprising system control means for comparing the password stored in the storage means with a password newly input by the input means, and controlling activation of the data processing system in accordance with a comparison result.

3. A system according to claim 2, wherein the system control means activities the data processing system if the password stored in the storage means coincides with the password newly input by the input means.

4. A system according to claim 1, further comprising:

means for checking whether the password stored in the storage means coincides with the password stored in the recording medium if the recording medium is set in the data processing system; and means for erasing the password stored in the storage means and the password stored in the recording medium, if the password stored in the storage means coincides with the password stored in the recording medium.

5. A system according to claim 1, wherein the write control means writes identification information unique to the recording medium in the recording medium together with the password.

6. A system according to claim 5, further comprising:

means for, if the recording medium in which the password and the identification information are stored is set in the data processing system, checking whether the identification information stored in the recording medium is identification information unique to the recording medium;

means for checking the password stored in the recording medium coincides with the password stored in the storage means if the identification information stored in the recording medium is the identification information unique to the recording medium; and means for erasing the password stored in the storage means and the password stored in the recording medium if the password stored in the storage means coincides with the password stored in the recording medium.

7. A system according to claim 1, wherein the recording medium includes a floppy disk, and, if the recording medium is the floppy disk, the write control means formats a predetermined area of the floppy disk, and writes the input password in the formatted area.

8. A password management method in a data processing system which allows a recording medium to be set therein and has a password memory for storing a password, comprising the steps of:

inputting a password;

storing the input password;

checking whether a recording medium is set in the data processing system if a password is input; and writing the input password in the recording medium if the recording medium is set in the data processing system.

9. A method according to claim 8, further comprising the steps of:

comparing the stored password with a newly input password; and controlling activation of the data processing system in accordance with a comparison result.

10. A method according to claim 9, wherein if the password stored in the password memory coincides with the newly input password, the data processing system is activated.

11. A method according to claim 9, wherein if the recording medium is set in the data processing system, identification information unique to the recording medium is written in the recording medium together with the password.

12. A method according to claim 11, further comprising the steps of:

checking whether the identification information stored in the recording medium is identification information unique to the recording medium if the recording medium in which the password and the identification information are stored is set in the data processing system;

checking whether the password stored in the recording medium coincides with the password stored in the password memory if the identification information stored in the recording medium is the identification information unique to the recording medium; and erasing the password stored in the password memory and the password stored in the recording medium if the password stored in the password memory coincides with the password stored in the recording medium.

13. A method according to claim 8, further comprising the steps of:

checking whether the password stored in the password memory coincides with the password stored in the recording medium if the recording medium in which the password is stored in set in the data processing system; and erasing the password stored in the password memory and the password stored in the recording medium if the password stored in the password memory coincides with the password stored in the recording medium.

14. A method according to claim 8, wherein the recording medium includes a floppy disk, and, if the recording medium is the floppy disk, a predetermined area of the floppy disk is formatted, and the input password is written in the formatted area.

15. A data processing system which allows a recording medium to be set therein and has a password memory for storing a password, comprising:

means for displaying a setup menu having key input regions;

tablet means for producing coordinate information representing a position to be touched in the key input regions and inputting the produced coordinate information as the password;

pen means for touching the tablet means;

means for checking whether the recording medium is set in the data processing system if the password is input from the tablet means; and means for writing the input password into the recording medium if the recording medium is set in the data processing system.

16. A data processing system which allows a recording medium to be set therein and has a password memory for storing a password, comprising:

means for checking whether the recording medium in which the password is stored is set in the data processing system;

means for checking whether the password stored in the password memory coincides with the password stored in the recording medium if the recording medium in which the password is stored is set in the data processing system; and means for erasing the password stored in the password memory and the password stored in the recording medium if the password stored in the password memory coincides with the password stored in the recording medium.

17. A password management method in a data processing system which allows a recording medium to be set therein and has a password memory for storing a password, comprising the steps of:

checking whether the recording medium in which the password is stored is set in the data processing system;

checking whether the password stored in the password memory coincides with the password stored in the recording medium if the recording medium in which the password is stored is set in the data processing system; and erasing the password stored in the password memory and the password stored in the recording medium if the password stored in the password memory coincides with the password stored in the recording medium.

18. A computer system for controlling an operation of the computer system on the basis of password information, comprising:

means for inputting a password data in the computer system;

means for storing the password data input by the inputting means;

means for setting a recording medium in the computer system;

a specific recording medium removably set to the setting means;

means for detecting whether the specific recording medium is set in the setting means after the computer system is powered on; and means for starting the operation of the computer system regardless of the password data stored in the storing means when the detecting means detects that the specific recording medium is set in the setting means.

19. A system according to claim 18, wherein the specific recording medium has a floppy disk.

20. A system according to claim 18, further comprising means for erasing the password data stored in the storing means when the detecting means detects the specific recording medium is set to the setting means.

21. A system according to claim 18, further comprising means for storing the password data into the specific recording medium.

22. A system according to claim 21, further comprising means for storing an identification information unique together with the password data into the specific recording medium.

23. A system according to claim 21, wherein the detecting means includes means for checking whether the password data stored in the storing means coincides with the password data stored in the specific recording medium if the recording medium is set in the setting means.

24. A system according to claim 22, wherein the detecting means includes means for checking whether the identification information stored in the specific recording medium is identification information unique to the specific recording medium.

25. A system according to claim 18, wherein the specific recording medium has an extended memory card.

26. A password management method of a computer system for controlling an operation of the computer system on the basis of password data and having a setting means for setting a recording medium, comprising the steps of:

inputting a password data;

storing the input password;

setting the recording medium in the setting means; detecting whether the recording medium is a specific recording medium;

starting the operation of the computer system regardless of the password data when it is detected that the specific recording medium is set in the setting means.

27. A computer system, comprising; a data input device inputting a password data; a memory storing the password data input from the data input device;

an external memory removably setting an recording medium;

a specific recording medium removably set to the external memory;

means for preventing the computer system from operating unless an input data, input from the data input device after the computer system is powered on, corresponds to the password data stored in the memory;

means for detecting whether the specific recording medium is set to the external memory when the computer system is powered on; and means for permitting the operation of the computer system without the input of the input data when the detecting means detects the specific recording medium is set in the external memory.

28. A system according to claim 27, comprising wherein the recording medium has a floppy disk.

29. A system according to claim 28, further comprising means for erasing the password data stored in the memory when the detecting means detects the specific recording medium is set to the external memory.

30. A system according to claim 27, further comprising means for storing the password data into the specific recording medium.

31. A system according to claim 30, further comprising means for storing an identification information unique together with the password data into the specific recording medium.

32. A system according to claim 30, wherein the detecting means includes means for checking whether the password stored in the memory coincides with the password stored in the specific recording medium if the specific recording medium is set to the external memory.

33. A system according to claim 31, wherein the detecting means includes means for checking whether the identification information stored in the specific recording medium is identification information unique to the specific recording medium.

34. A computer system, comprising:

a keyboard inputting a password data; a non-volatile memory storing the password data input from the keyboard;

a floppy disk drive removably setting a floppy disk;

a key floppy disk removably set to the floppy disk drive;

means for preventing the computer system from operating unless an input data, input from the keyboard after the computer system is powered on, corresponds to the password data stored in the non-volatile memory;

means for detecting whether the key floppy disk is set to the floppy disk drive when the computer system is powered on; and means for permitting the operation of the computer system without the input of the input data when the detecting means detects the key floppy disk is set to the floppy disk drive.

35. A computer system, comprising:

a tablet for producing coordinate data representing a predetermined position;

a pen for inputting a password data by pointing a predetermined position on the tablet;

a non-volatile memory storing the password data input by the pen;

an extended memory card removably set to the computer system;

means for preventing the computer system from operating unless an input data, input by the pen after the computer system is powered on, corresponds to the password data stored in the non-volatile memory;

means for detecting whether the extended memory card is set to the computer system when the computer system is powered on; and means for permitting the operation of the computer system without the input of the input data when the detecting means detects the extended memory card is set to the computer system.

* * * * *